US006894660B2

(12) United States Patent
Sanogo

(10) Patent No.: US 6,894,660 B2
(45) Date of Patent: May 17, 2005

(54) RADIO FREQUENCY ANTENNA FOR AN OBJECT INTERROGATION DEVICE COMPRISING A RADIO FREQUENCY ANTENNA ASSOCIATED WITH AN ELECTRONIC CIRCUIT

(75) Inventor: Lassina Sanogo, Manosque (FR)

(73) Assignee: Tagsys SA (FR)

( * ) Notice: Subject to any disclaimer, the term of this patent is extended or adjusted under 35 U.S.C. 154(b) by 217 days.

(21) Appl. No.: 10/167,793

(22) Filed: Jun. 12, 2002

(65) Prior Publication Data

US 2002/0186175 A1 Dec. 12, 2002

Related U.S. Application Data

(63) Continuation of application No. PCT/FR00/03285, filed on Nov. 24, 2000.

(30) Foreign Application Priority Data

Dec. 16, 1999 (FR) .............................................. 99 15901

(51) Int. Cl.[7] ................................................. H01Q 1/36
(52) U.S. Cl. ..................... 343/895; 343/787; 340/572.2
(58) Field of Search ................................ 343/741, 742, 343/866, 867, 895, 787, 788; 340/551, 572.2; 235/492

(56) References Cited

U.S. PATENT DOCUMENTS

| 4,745,401 | A | * | 5/1988 | Montean .................. 340/572.3 |
| 5,420,579 | A | | 5/1995 | Urbas et al. ................. 343/895 |
| 5,623,271 | A | | 4/1997 | Ponnapalli ............. 340/870.31 |
| 6,164,551 | A | * | 12/2000 | Altwasser ................... 235/492 |
| 6,252,508 | B1 | * | 6/2001 | Vega et al. ............... 340/572.1 |
| 6,335,686 | B1 | * | 1/2002 | Goff et al. ................ 340/572.4 |
| 6,480,110 | B2 | * | 11/2002 | Lee et al. ................. 340/572.5 |
| 6,714,120 | B2 | * | 3/2004 | Blama et al. .............. 340/10.1 |

FOREIGN PATENT DOCUMENTS

| EP | 0 610 546 A1 | 8/1994 |
| WO | WO 98/05171 | 2/1998 |

* cited by examiner

Primary Examiner—Tan Ho
(74) Attorney, Agent, or Firm—DLA Piper Rudnick Gray Cary US LLP

(57) ABSTRACT

A transmission/reception radio-wave aerial for an interrogation device for electronic labels carried by objects, the transmission/reception radio-wave aerial being tuned to an F0 frequency and each electronic label including a radio-wave aerial tuned to the F0 frequency and being associated with an electronic circuit, wherein the transmission/reception radio-wave aerial is arranged to create a magnetic field which modifies the tuning frequency for the radio-wave aerials for the electronic labels in such a way to retune towards the F0 frequency of the aerial of the interrogation device.

16 Claims, 3 Drawing Sheets

RADIO FREQUENCY ANTENNA FOR AN OBJECT INTERROGATION DEVICE COMPRISING A RADIO FREQUENCY ANTENNA ASSOCIATED WITH AN ELECTRONIC CIRCUIT

RELATED APPLICATION

This is a continuation of International Application No. PCT/FR00/03285, with an international filing date of Nov. 24, 2000, which is based on French Patent Application No. FR 99/15901, filed Dec. 16, 1999.

FIELD OF THE INVENTION

This invention concerns systems for identifying objects of the type in which each object carries a radio-wave aerial associated with an electronic circuit so that it may be interrogated by an interrogation device including a transmission/reception radio-wave aerial. More specifically, it involves one such transmission/reception radio-wave aerial.

BACKGROUND

It is known to identify objects by fitting them with labels called electronic labels which include a radio-wave aerial associated with an electronic circuit. The latter includes at least a memory containing the characteristics for identifying the object. An interrogation device transmits, using its radio-wave aerial, interrogation messages to the electronic labels and receives messages in response from the latter containing the information requested. These interrogation and response messages are transmitted according to a procedure called "anti-collision" in such a way as to make the electronic labels send out their response messages at different times.

One such system for identifying objects works in a satisfactory manner when the electronic labels are far enough away from one another. In effect, in the case of electronic labels that are very close to one another, for example, when arranged on sheets stacked one on top of the other, the tuned circuits of the different aerials are put out of tune with respect to the central F0 frequency for presenting resonance frequencies lower than and higher than F0. The result of this is that the transmission of the messages is disrupted, which leads to identification faults. One such malfunction has been noted when the objects are thin books which are stacked together on a shelf vertically or horizontally.

It would therefore be advantageous to provide a transmission/reception radio-wave aerial for an interrogation device for electronic labels carried by the objects to be identified which allows the electronic label to be interrogated whatever the distance may be that separates them.

SUMMARY OF THE INVENTION

This invention relates to a transmission/reception radio-wave aerial for an interrogation device for electronic labels carried by objects, the transmission/reception radio-wave aerial being tuned to an F0 frequency and each electronic label including a radio-wave aerial tuned to the F0 frequency and being associated with an electronic circuit, wherein the transmission/reception radio-wave aerial is arranged to create a magnetic field which modifies the tuning frequency for the radio-wave aerials for the electronic labels in such a way to retune towards the F0 frequency of the aerial of the interrogation device.

This invention also relates to an electronic label interrogation device including a transmission/reception aerial, as described above.

BRIEF DESCRIPTION OF THE DRAWINGS

Other characteristics and advantages for the present invention will appear when reading the following description of specific examples for its production, with the said description being made in relation to the attached drawings in which.

DETAILED DESCRIPTION

Figure 1:
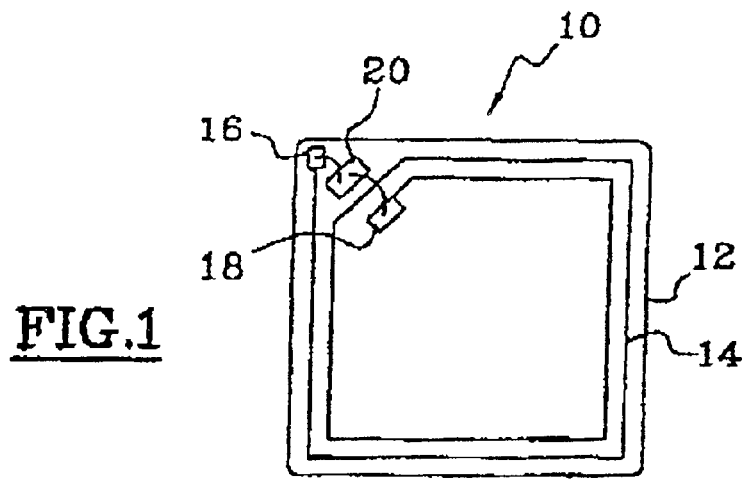
FIG. 1 is a sketch of an aerial for an electronic label planned to be carried by an object such as a book.

It will be appreciated that the following description is intended to refer to specific embodiments of the invention selected for illustration in the drawings and is not intended to define or limit the invention, other than in the appended claims.

This invention concerns a transmission/reception radio-wave aerial for an interrogation device for electronic labels carried by objects, with the transmission/reception radio-wave aerial being tuned to an F0 frequency and each electronic label including a radio-wave aerial tuned to the F0 frequency and being associated with an electronic circuit, characterized by the fact that the transmission/reception radio-wave aerial is configured in such a way as to create a magnetic field which modifies the frequency for tuning the radio-wave aerials for the electronic labels in such a way that it will tend to retune it towards the F0 frequency.

The magnetic field created by the transmission/reception radio-wave aerial has some force lines which are noticeably substantially perpendicular to the plane of the aerials in the electronic labels to be interrogated.

One such aerial is produced, for example, by a planar winding including a plurality of flat turns whose width is noticeably larger than their spacing. It may also be made with a winding including a plurality of turns not joined together wound around a support made of ferrite. In this case, the spacing of the turns is noticeably greater than their diameter.

Turning now to the drawings generally and FIG. 1 in particular, an electronic label 10 includes, for example, a soft support 12 made of a dielectric material which measures about two to three centimeters on each side, on which a conductor winding 14 fitted with two connection terminals 16 and 18 and an electronic circuit 20 are arranged, which is connected to the terminals 16 and 18.

The electronic circuit 20 is well-known and shall not be described in further detail here.

Figure 6:
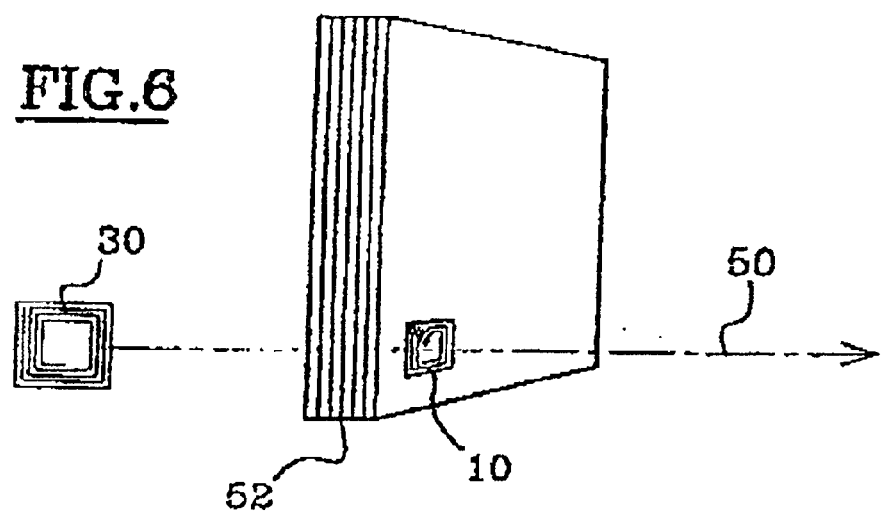
FIG. 6 illustrates the position and the shift direction for the transmission/reception radio-wave aerial according to the invention with respect to some electronic labels set out vertically.
Figure 7:
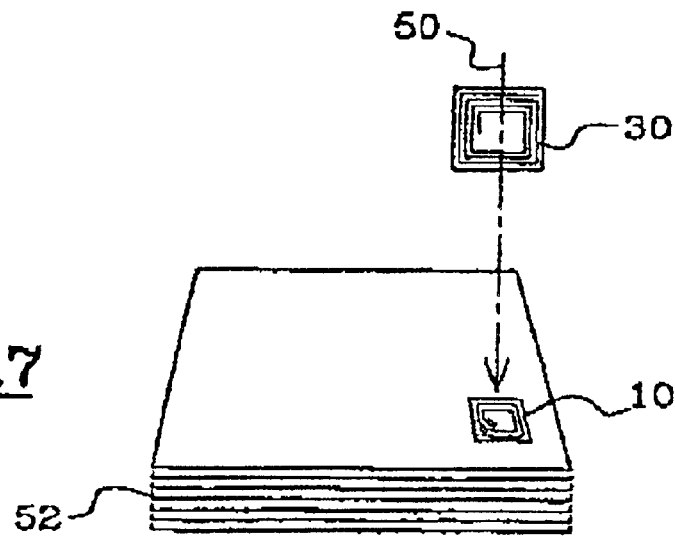
FIG. 7 illustrates the position and the shift direction for the transmission/reception radio-wave aerial according to the invention with respect to some electronic labels set out horizontally.

In the case of a book, the electronic label 10 is stuck, for example, on the first or the last page close to the binding and the inside cover (FIGS. 6 and 7).

Figure 2:
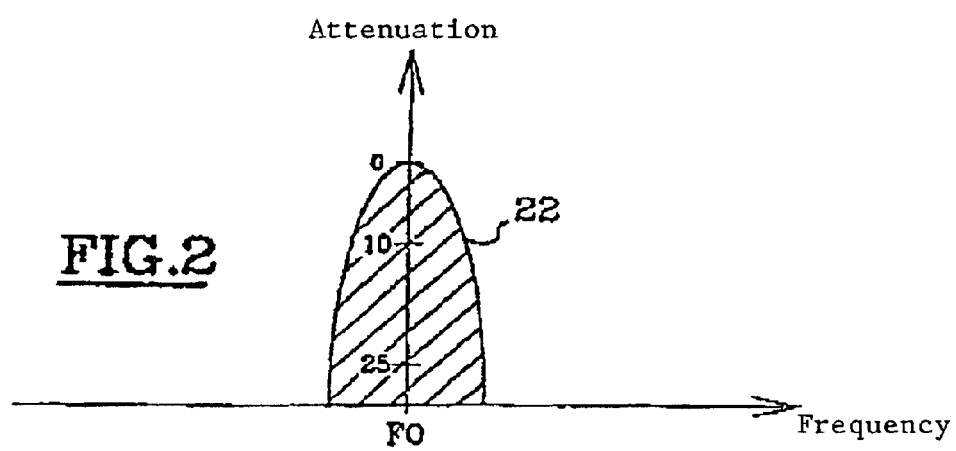
FIG. 2 is a diagram showing the attenuation curve for a radio-wave aerial in an electronic label.
Figure 3:
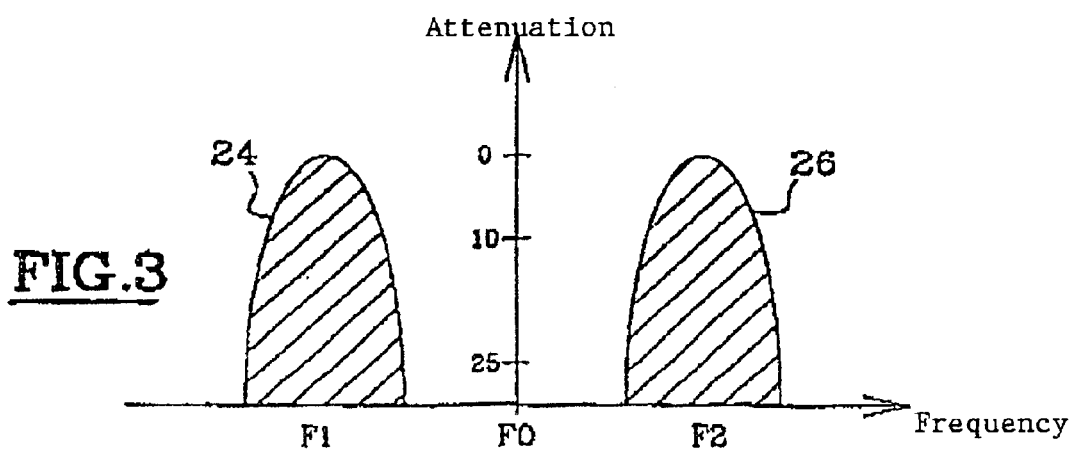
FIG. 3 is a diagram showing the attenuation curves for two heavily coupled radio-wave aerials.

The winding 14 constitutes a coil which, in combination with a condenser, that is not shown, produces a circuit tuned to a resonance frequency F0. This F0 frequency is, for example, equal to 13.56 Megahertz. The attenuation curve for such a circuit, tuned according to the frequency, is given by the diagram 22 in FIG. 2 centered on the F0 frequency. When two labels 10 are placed on top of each other, the attenuation curves measured are those in FIG. 3, that is to say, some curves that are analogous to the one in FIG. 2 but with each one 24 shifted towards a frequency of F1<F0 and the other one 26 towards a frequency of F2>F0.

Figure 4:
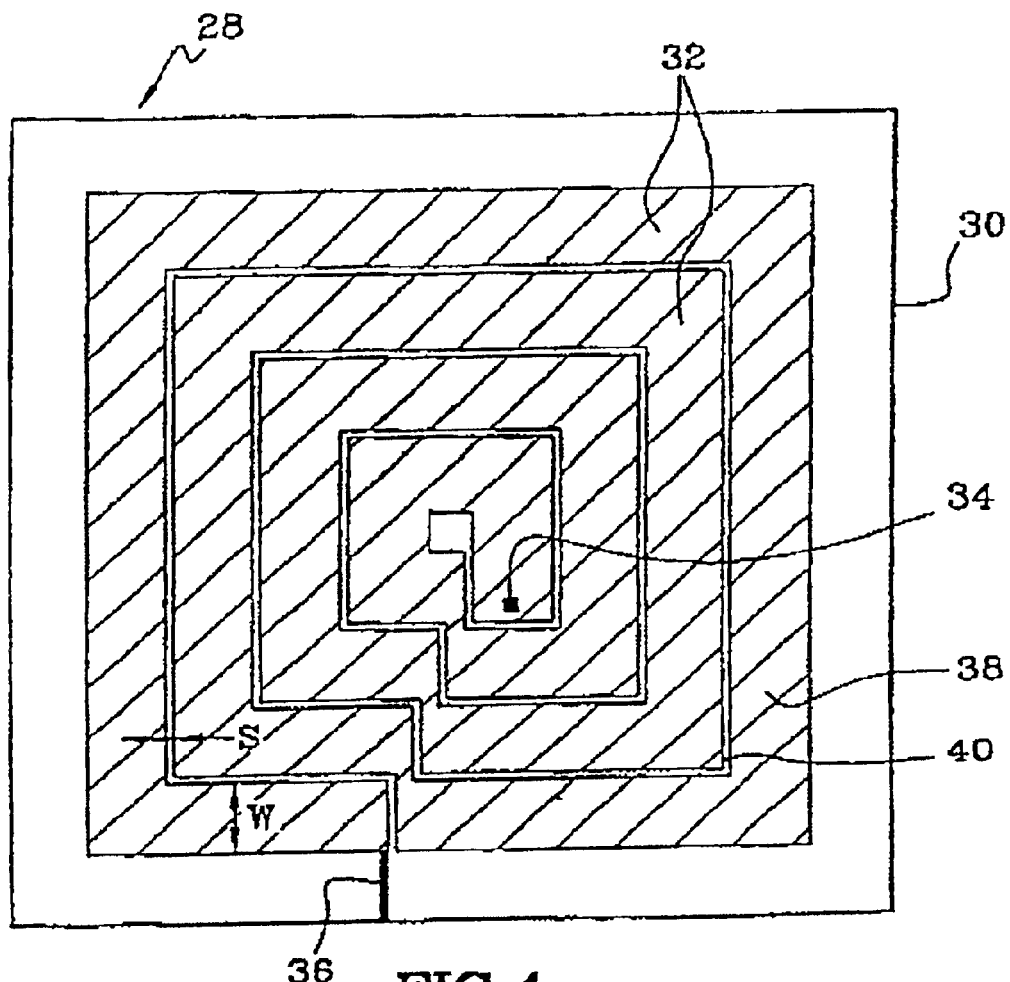
FIG. 4 is a sketch showing a planar winding for producing a first type of transmission/reception radio-wave aerial according to the invention.

As shown in FIG. 4, the radio-wave aerial 28 for the electronic labels 10 interrogation device includes a rigid support 30 made of a dielectric material, measuring around 10 centimeters along the side, on which a planar conductor winding 32 with two connection terminals 34 and 36 are set out in an electronic circuit, which is not shown.

The winding 32 is formed by some turns made up by long conductor strips 38 separated by a very narrow space 40. By way of an example, the conductor strip 38 has a width W of around ten millimeters while the spacing between the strips S 40 is around one millimeter, that is to say an order of magnitude of difference between their measurements. This winding 32, when it is supplied by a radio-wave current, creates a magnetic field which modifies the frequency for the F1 tuning to bring it towards the F0 frequency, which allows the interrogation to be successful.

Figure 8:
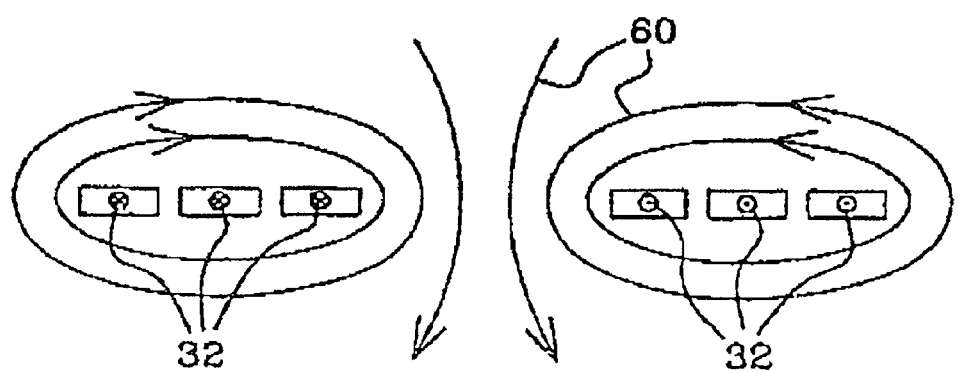
FIG. 8 is a sketch showing the force lines of the magnetic field created by the conductors 32 in the aerial represented in FIG. 4.

In the plane perpendicular to that of the rigid support 30 (FIG. 8), the turns for the winding 32 create a lateral magnetic field whose force lines, referred to 60, are looped around distances that are relatively far away from the plane of the rigid support 30.

For the sake of better efficiency, the force lines in this magnetic field are noticeably substantially perpendicular to the plane of the winding for the electronic label aerial.

The measurements of the winding 32, and therefore of the aerial, mainly depend on the maximum distance between the interrogation device aerial and the electronic label to be interrogated, with the relative gaps between the labels being taken into account.

Thus, the aerial 28 should not be too small vis-à-vis the electronic label to prevent having to perform a localization search according to the position of the electronic label. It should not be too large to prevent losses from the force lines in the field, the force lines would then no longer be picked up by the aerial in the electronic label. These different criteria lead to an aerial 28, which has a surface area equal to about fifteen times that of the electronic label, that is to say noticeably equal to an order of magnitude.

The presence of the aerial 28, run by a current at the F0 frequency, close to an electronic label 10, has the effect of inducing an alternative current in the aerial winding of the electronic label, which creates an opposite magnetic field as a reaction acting on the aerial 28. Since this aerial 28 is presented under the form of a metal plane as a result of the conductor strips 38 placed side by side, it has the effect of reducing the coupling between the two windings, which corresponds to a drop in the self-inductance L of the electronic label aerial hence an increase in the tuning frequency from F1 to F0.

Figure 5:
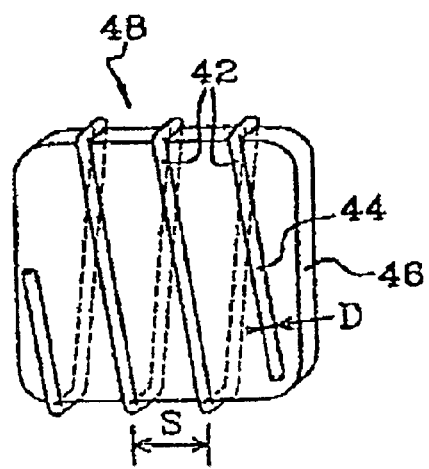
FIG. 5 is a sketch showing a winding around a support made of ferrite for producing a second type of transmission/reception radio-wave aerial according to the invention.

The aerial for the interrogation device may also be produced according to the sketch in FIG. 5 by a winding 42 of turns not joined together of a conductor wire 44 around a support made of ferrite 46, for example, a ferrite plate measuring a few centimeters along the side. The ferrite plate modifies the tuning frequency of the label aerial to take it from F2 to F0. By way of an example, the turns numbering around three have a diameter D of around one millimeter and the spacing S between the turns is about twenty millimeters. The ferrite plate 46, for example, is a square measuring ten centimeters along each side.

In this second example for production, spacing S is noticeably larger than diameter D, around one order of magnitude.

The ferrite plate 46 has the effect of concentrating the force lines of the magnetic field in the ferrite due to the fact that it has a high conductivity factor, which increases the coupling between the two windings. Hence, there is an increase in the self-inductance L for the electronic label aerial whose tuning frequency drops from F2 to F0.

To produce an efficient interrogation of the labels, it is recommended, on the one hand, to set out the electronic labels 10 on the objects such as the documents 52 in FIGS. 6 and 7, according to the strict specifications and, on the other hand, to move the aerial for interrogation according to the predefined rules. The specifications concerning the arrangement of the labels are defined below. As far as the movement of the aerial 28 or 48 is concerned, its flat side should be perpendicular to the plane of the electronic labels 10 and be moved (arrow 50) in a substantially perpendicular fashion to the plane of the electronic labels 10. Of course, the route of the aerial must be as close as possible to the electronic labels 10.

The aerial according to the invention has the following advantages:

it is light, reproducible and inexpensive;

it allows great speed for scanning the shelves where the documents, such as books, are stacked;

it is not very sensitive to the metal environment of the shelves, and it allows a portable unit to be made because it does not require a high output power supply.

What is claimed is:

1. A transmission/reception radio-wave aerial for an interrogation device for electronic labels carried by objects, the transmission/reception radio-wave aerial being tuned to an F0 frequency and each electronic label including a radio-wave aerial tuned to the F0 frequency and being associated with an electronic circuit, wherein the transmission/reception radio-wave aerial is arranged to create a magnetic field which modifies the tuning frequency for the radio-wave aerials for the electronic labels in such a way to retune towards the F0 frequency of the aerial of the interrogation device.

2. The aerial according to claim 1, wherein the transmission/reception radio-wave aerial is suitable for creating the magnetic field whose force lines are substantially perpendicular to the plane of the aerials in the electronic labels.

3. The aerial according to claim 2, wherein the aerial for the interrogation device includes a substantially planar winding including a plurality of turns the width (W) of which is larger than their spacing (S).

4. The aerial according to claim 3, characterized in that width (W) of a turn is at least one order of magnitude greater than the spacing.

5. The aerial according to claim 2, wherein the aerial for the interrogation device includes a winding including a plurality of turns wound around a support made of ferrite.

6. The aerial according to claim 5, wherein the turns have a spacing (S) which is greater than their diameter (D).

7. The aerial according to claim 6, wherein the spacing (S) between two consecutive turns is at least one order of magnitude larger than their diameter (D).

8. The aerial according to claim 1, wherein the aerial for the interrogation device includes a winding including a plurality of turns wound around a support made of ferrite.

9. The aerial according to claim 8, wherein the turns have a spacing (s) which is greater than their diameter (D).

10. The aerial according to claim 9, wherein the spacing (S) between two consecutive turns is at least one order of magnitude larger than their diameter (D).

11. The aerial according to claim 1, wherein the measurements of the interrogation device aerial are determined by the maximum distance between the aerial and the aerials for the objects as well as by the measurements of the electronic labels.

12. The aerial according to claim 1, wherein the surface area of the aerial of the interrogation device is around one order of magnitude greater than that of the electronic label aerial.

13. An electronic label interrogation device comprising a transmission/reception aerial as claimed in claim 1.

14. A transmission/reception radio-wave aerial for an interrogation device for electronic labels carried by objects, the transmission/reception radio-wave aerial being tuned to an F0 frequency and each electronic label including a radio-wave aerial tuned to the F0 frequency and being associated with an electronic circuit, wherein the transmission/reception radio-wave aerial is arranged to create a magnetic field which modifies the tuning frequency for the radio-wave aerials for the electronic labels in such a way to retune towards the F0 frequency of the aerial of the interrogation device, wherein the aerial for the interrogation device includes a substantially planar winding including a plurality of turns the width (W) of which is larger than their spacing (S).

15. The aerial according to claim 14, characterized in that width (W) of a turn is at least one order of magnitude greater than the spacing.

16. A transmission/reception radio-wave aerial for an interrogation device for electronic labels carried by objects comprising:
   a dielectric support;
   a conductor winding having at least two terminal connections fixed to the dielectric support; and
   an electronic circuit connected between the terminal connections and tuned to an F0 frequency,
   wherein current passing through the conductor winding creates a magnetic field which modifies tuning frequencies for radio-wave aerials for other electronic labels to retune towards the F0 frequency of the aerial of the interrogation device.

* * * * *